Nov. 10, 1953 — A. H. PERLMAN — 2,658,547
TIRE CHAIN CROSS-LINK AND ANCHOR ASSEMBLY
Filed Aug. 1, 1952
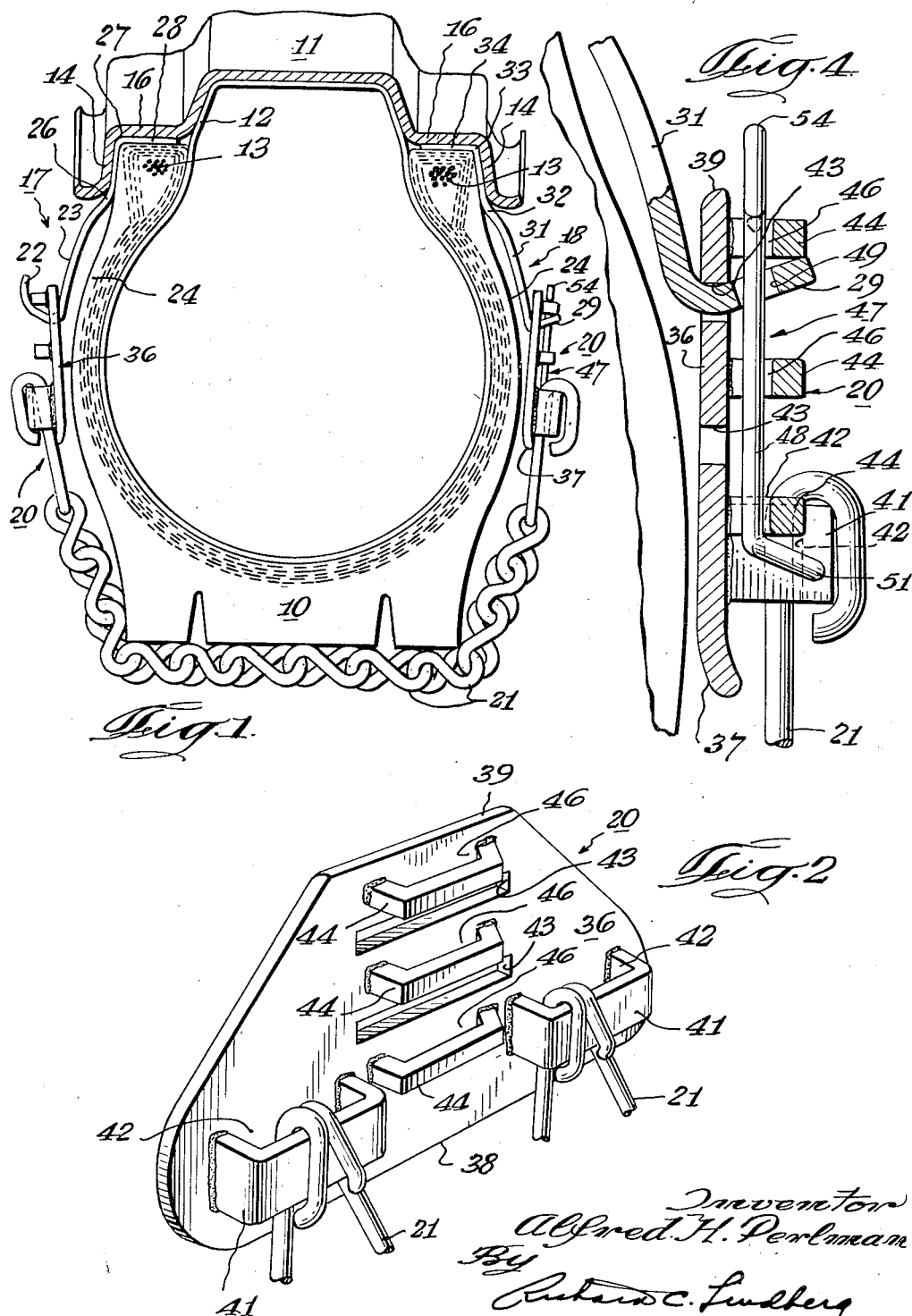

Nov. 10, 1953      A. H. PERLMAN      2,658,547
TIRE CHAIN CROSS-LINK AND ANCHOR ASSEMBLY
Filed Aug. 1, 1952      2 Sheets-Sheet 2
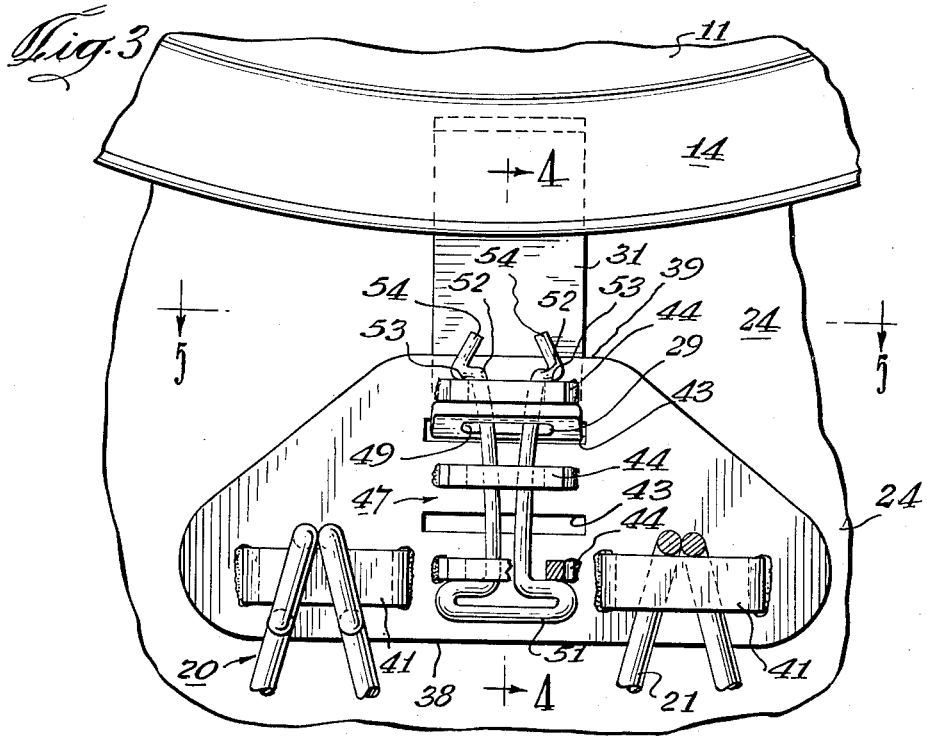
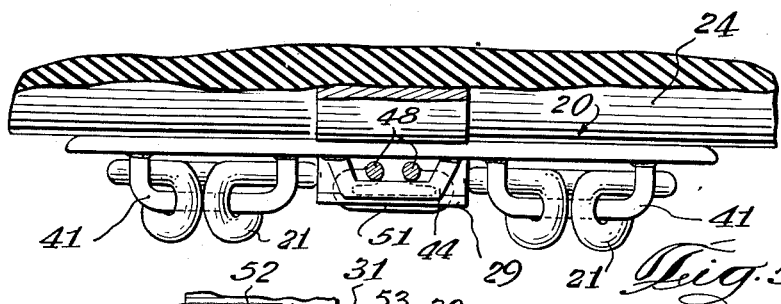
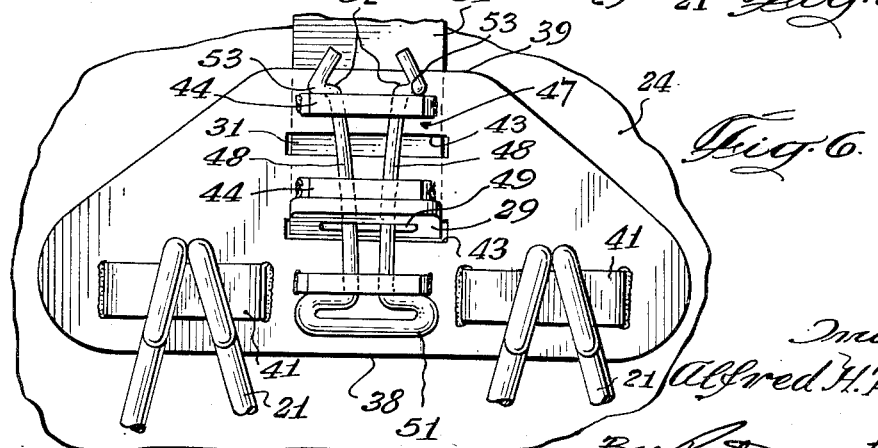

Patented Nov. 10, 1953

2,658,547

UNITED STATES PATENT OFFICE 2,658,547

TIRE CHAIN CROSS-LINK AND ANCHOR ASSEMBLY

Alfred H. Perlman, Chicago, Ill., assignor to Fral Manufacturing Co., Chicago, Ill., a corporation of Illinois Application August 1, 1952, Serial No. 302,071

6 Claims. (Cl. 152—233)

This invention relates generally to a tire chain cross-link assembly and relates more particularly to an assembly whereby the cross-links may readily be locked in place to the cross-link anchors, and may readily be detached therefrom.

One of the principal objects of the invention is to provide a cross-link assembly which may readily be secured to anchors held between the tire rim and the tire bead, the cross-link assembly being characterized by ready adaptation to tires of different sizes, and by being readily locked and unlocked to the anchors.

Other objects and important features of the invention will be apparent from a study of the following specification taken with the drawings which together show a preferred embodiment of the invention and what is now considered to be the best mode of applying the principles thereof. Other embodiments of the invention may be suggested to those having the benefit of the teachings of the within specification, and it is therefore intended that the invention not be limited by the precise embodiment herein shown and described, nor otherwise than by the scope and terms of the appended claims.

In the drawings:

Fig. 1 is a cross sectional view through a rim mounted pneumatic tire showing the cross-link assembly according to the present invention supported thereon;

Fig. 2 is a full scale perspective view of a cross link hanger forming a part of the assembly of Fig. 1;

Fig. 3 is a full scale side elevation view of the assembly of Fig. 1;

Fig. 4 is a section taken along the line 4—4 of Fig. 3;

Fig. 5 is a full scale top view looking in the direction of the arrows 5—5 of Fig. 3; and Fig. 6 is a full scale side view similar to Fig. 3 showing the hanger in a different position, as for a tire of smaller dimension.

Referring now to the drawings, the present invention is shown as embodied for use with a tire 10 which is held by inflation thereof to a rim 11 of the drop-center type commonly used on the modern automobile. The tire 10 is held by inflation to the rim 11 by means of a tube 12 in a manner well known in the art. While the invention is shown as adapted to a drop-center type of rim other types of rims may be used as well, and the construction according to the present invention may also be used with the so-called "tubeless" types of tires.

Irrespective of the type of rim, or whether the tire is inflated by a tube, the air within the tire exerts large radial and lateral pressures forcing the beads 13 against flanges 14 and offset rim portions 16. The beads 13 and the rim are adapted to hold a pair of tire chain anchors, each referred to generally by the reference numerals 17 and 18. Each of these is constructed slightly differently from the other for a purpose as will appear as this specification proceeds.

Each of the chain anchors 17 and 18 affords a means of connection to tire chain hangers referred to generally by the reference numeral 20 and having a pair of cross links 21 which span the tread of the tire 10.

The tire chain anchor 17 includes a hook 22 which is continuous with a substantially straight shank 23 which is spaced from a side wall 24 of the tire 10 so as to permit free flexing thereof. The shank 23 is bent slightly as at 26 so as to lie between the bead 13 and the flange 14, and then bent inwardly at 27 to provide a flat end 28 gripped between the offset rim portion 16 and the bead 13. The hook 22 affords a means of connection with one of the chain hangers 20 in a manner to be described.

The tire chain anchor 18 includes a substantially flat hook 29 which is continuous with a substantially flat shank 31 which is also spaced from the side wall 24 so as to permit free flexing thereof. The shank 31 is bent slightly as at 32 so as to lie between the opposite flange 14 and the opposite bead 13 and is bent inward at 33 to provide a flat end 34 which is gripped between the offset rim portion 16 and the bead 13.

The tire chain anchors 17 and 18 are mounted in pairs in the manner described on opposite sides of the tire 10, anchor 17 being mounted on the inner side of the tire 10, and anchor 18 being mounted on the outer side. As many of such pairs of anchors may be held by inflation of the tire 10 as desired, according to the number of cross links 21 it is desired to employ, the number being dictated by driving conditions, weight of the vehicle or other conditions.

Each chain hanger 20 is in the form of a trapezoidal shaped plate 36 and may be smoothly curved along its bottom edge as at 37 so as not to abrade or cut the tire 10. The longest dimension 38 of the plate 36 extends closest to the tread of the tire 10, and shortest dimension 39 extends closest to the rim 11. A pair of elongated loops 41 are shown as being welded near each end of the plate along the long dimension thereof, and afford a clearance 42 so that the ends of the chain links 21 may be brought therethrough and bent over and around the loops 41.

The chain hangers 20 are also provided with slots 43 which extend perpendicular to an axis of symmetry of the trapezoidal shaped plate 36. These slots are spaced from each other in the manner shown, and are arranged to form openings for hooking attachment with the anchors 17 and 18 at their respective hooks 22 and 29.

The chain hangers 20 are preferably made identical in shape for the reason of uniformity in manufacturing, but the outer chain hanger 20, as shown in Fig. 3, which is arranged to be in hooking engagement with the flat hook 29, is constructed so as to be locked in place after being slipped over the flat hook 29. To this end the plate 36 is provided with loops 44 which alternate with the slots 43, and which afford clearances 46 with the plate 36.

The loops 44 are arranged to receive a locking clip 47 having spaced limbs 48 arranged to pass through the clearances 46 and through an aperture 49 formed in the flat hook 29. As seen in Figs. 3 and 6 the locking clip 47 is essentially T-shaped and has a head 51 formed by bending of the limbs 48 in the manner shown. The ends of the limbs 48 remote from the head 51 are bent as 52 to provide shoulders 53 which bear against the topmost loop 44. The limbs 48 are bent slightly in an inward direction, as at 54, to provide entrant portions on the locking clip 47 to facilitate insertion thereof. The limbs 48 are arranged to have a spring-like action tending to separate the limbs so that ends 54 will separate with the shoulders 53 bearing on the topmost loop 44.

In assembling the device according to the present invention the tire 10 is first partially deflated, and the anchors 17 and 18 mounted on opposite sides of the tire 10, the pairs of anchors being spaced around the rim according to the number of cross links 21 desired to be used. The tire is then inflated firmly holding the anchors in place. The inside hanger 20 is then hooked on the inside hook 22 at either of the openings 43 according to the size of the tire 10. The opposite hanger 20 is then hooked over the flat hook 29 at either of the openings 43 according to the size of the tire 10.

The locking clip 47 is then inserted through the loops 44 and through the aperture 49 formed in the flat hook 29, the shoulders 51 of the locking clip 47 bearing against the topmost loop 44.

In Fig. 6 there is shown a different position of the hanger 20, the position being for a smaller tire than that shown in Fig. 3. It will be noted that the spacing of the loops 44 is such that, irrespective of where the hanger 20 is hooked to the flat hook 29, the head 51 bears against loop 44 located between the chain loops 41 while the opposite end is locked against the loop 44 disposed along the small dimension 39 of the chain hanger 20.

It may also be noted that irrespective of the point of hooking engagement upon the hook 29, the chain hanger 20 may freely swivel on the hook without imposing any bending upon the locking clip 47.

As an alternate form of construction of the hanger 20, the loops 41 and 44 may be made by a punching operation. The chain hangers 20, the locking clip 47 and the anchors 17 and 18 are all made of treated steels so as to withstand the centrifugal forces induced by rotation of the tire 10 and the abrasive action of traffic.

While the invention has been described in terms of a preferred embodiment, the scope thereof is intended to be limited only by the terms of the claims here appended.

I claim as my invention:

1. In a tire chain anchor and cross-chain assembly for a pneumatic tire adapted to be held by inflation thereof to a straight side rim, a tire chain anchor lying one on each side of said tire and held by the pressure of the bead of said tire against said rim, a pair of tire chain hangers having at least one cross chain thereon spanning the tread of said tire, a hook formed on one of said anchors for hooking engagement with one of said hangers, a hook formed on the other of said anchors for hooking engagement with the other of said hangers, a pair of loops formed on the other said hanger, said loops lying one on each side of said last named hook, an opening formed in said last named hook, and a locking clip passing through said loops and said opening for holding the other said hanger in locking engagement with said last named hook.

2. The invention as defined in claim 1 wherein the other said hanger is provided with openings alternating with said loops whereby the position of the other said hanger on the other of said anchors may be adjusted in accordance with the size of the tire.

3. The invention as defined in claim 2 wherein said locking clip is provided with a head bearing against a loop of extreme position and is provided with an entrant portion having a shoulder bearing against another loop of extreme position.

4. In a tire chain and cross chain assembly for a pneumatic tire adapted to be held by inflation thereof to a straight side rim, a tire chain anchor lying one on each side of said tire and held by the pressure of the bead of said tire against said rim, a hook formed at the end of each anchor, a pair of tire chain hangers having at least one cross-chain connected thereto and spanning the tread of said tire, at least one slot in each of said hangers forming points of hooking engagement with said anchors, a pair of loops formed on one of said hangers and arranged to be on each side of the slot of such hanger, an opening formed in the hook of the anchor in hooking engagement with the said one hanger, and a locking clip passing through said loops and said opening for holding the said one hanger in position in hooking engagement with the last named anchor.

5. The invention as defined in claim 4 wherein the said one hanger has slots for such hooking engagement which alternate in position with said loops so as to position said one hanger according to the size of said tire.

6. The invention as defined in claim 5 wherein said locking clip is provided with a head bearing against a loop of extreme position and is provided with an entrant portion having a shoulder bearing against another loop of extreme position.

ALFRED H. PERLMAN.

References Cited in the file of this patent

UNITED STATES PATENTS

| Number | Name | Date |
| --- | --- | --- |
| 2,069,978 | Stahl | Feb. 9, 1937 |
| 2,461,267 | Givens | Feb. 8, 1949 |
| 2,597,160 | McGuinness | May 20, 1952 |
| 2,598,594 | Perlman | May 27, 1952 |